United States Patent [19]

Willey

[11] Patent Number: 5,878,038
[45] Date of Patent: Mar. 2, 1999

[54] METHOD IN A WIRELESS CODE DIVISION MULTIPLE ACCESS COMMUNICATION SYSTEM FOR DELIVERING A MESSAGE TO A MOBILE COMMUNICATION UNIT

[75] Inventor: William D. Willey, Arlington Heights, Ill.

[73] Assignee: Motorola, Inc., Schaumburg, Ill.

[21] Appl. No.: 807,926

[22] Filed: Feb. 28, 1997

[51] Int. Cl.$^6$ .......................... H04B 7/216; H04B 7/212
[52] U.S. Cl. .......................... 370/335; 370/342; 370/337; 455/515
[58] Field of Search ..................... 370/335, 324, 370/330, 321, 341, 342; 455/426, 434, 435, 436, 445, 453, 458, 459, 511, 515, 512

[56] References Cited

U.S. PATENT DOCUMENTS

| | | | |
|---|---|---|---|
| 4,870,408 | 9/1989 | Zdunek et al. | |
| 5,570,467 | 6/1995 | Sawyer | 455/515 |
| 5,603,081 | 11/1993 | Raith et al. | 455/435 |
| 5,640,396 | 9/1995 | Cudak et al. | 370/337 |

OTHER PUBLICATIONS

Harri Honkasalo, "High Speed Data Air Interface", Submission to CDMA Development Group by Nokia (1996), specifically sec. 3.1.3.

TR–45 "Short Message Services for Wideband Spread Spectrum Cellular Systems", published as TIA/EIA/IS–637, Dec. 7, 1994, specifically Sec. 2.4.1.2.

*Primary Examiner*—Chi H. Pham
*Assistant Examiner*—Steven Nguyen
*Attorney, Agent, or Firm*—Heather L. Creps

[57] ABSTRACT

The method operates in a wireless code division multiple access (CDMA) communication system (10) which includes a fixed communication unit (114). The fixed communication unit has a plurality of paging channels (230, 235) and a plurality of traffic channels (245, 247). A mobile communication unit (320) is responsive to the fixed communication unit via an active paging channel of the plurality of paging channels. The method includes selecting a paging channel of the plurality of paging channels over which to transmit the message to form a selected paging channel (410); transmitting a preliminary message via each of the plurality of paging channels (415), the preliminary message comprising the selected paging channel; and transmitting the message over the selected paging channel (425), the mobile communication unit receiving the message over the selected paging channel while continuing to monitor the active paging channel.

11 Claims, 3 Drawing Sheets

5,878,038

METHOD IN A WIRELESS CODE DIVISION MULTIPLE ACCESS COMMUNICATION SYSTEM FOR DELIVERING A MESSAGE TO A MOBILE COMMUNICATION UNIT

FIELD OF THE INVENTION

This invention relates generally to wireless communication systems, and, more particularly, to a method in a wireless code division multiple access communication system for delivering a message to a mobile communication unit.

BACKGROUND OF THE INVENTION

In a typical wireless communication system such as a cellular radio frequency (RF) radiotelephone system, a base station system having a controller and a plurality of transmitters and receivers communicates with a switching center and with a mobile communication unit, or mobile station, operating within an area served by the base station system.

Multiple access wireless communication between the base station and the mobile station occurs via RF channels which provide paths over which communication signals such as voice, data and video are transmitted. Base-to-mobile station communications are said to occur on a forward- or down-link channel, while mobile-to-base station communications are referred to as being on a reverse- or up-link channel.

Code division multiple access (CDMA) is one example of a well-known digital RF channelization technique. A communication system using CDMA channelization is described in detail in TIA/EIA Interim Standard IS-95A Mobile Station-Base Station Compatibility Standard for Dual-Mode Wideband Spread Spectrum Cellular System, Telecommunications Industry Association, Washington, D.C. July 1993 [IS-95A]; "TIA Telecommunications Systems Bulletin: Support for 14.4 kbps Data Rate and PCS Interaction for Wideband Spread Spectrum Cellular Systems", February 1996 [the Bulletin]; and in TIA/EIA Interim Standard IS-96 [IS-96], IS-95A, the Bulletin and IS-96 incorporated herein by reference. Another communication system using CDMA channelization is described in TIA/EIA Interim Standard IS-99, Data Services Option Standard for Wideband Spread Spectrum Digital Cellular System, Telecommunications Industry Association, Washington, D.C., also incorporated herein by reference.

Typically, all users of a CDMA system transmit and receive communication signals over a common frequency spectrum, and specialized codes, such as Walsh codes, are used for separating multiple communication signals from one another in the system. Each specialized code typically represents one communication channel within the common frequency spectrum. A communication channel may be, among other things, a paging channel or a traffic channel.

IS-95A provides a maximum baseband data rate of 9600 bits per second for a communication signal on a particular down-link channel, although lower data rates are often used for periods of less speech activity. Generally, communication signals broadcast to subscriber units on traffic channels require different amounts of down-link power according to the baseband data rate, and a signal having higher baseband data rate is transmitted at a higher down-link power level than a signal having a lower baseband data rate.

It may be desirable in a CDMA communication system to deliver the same message to a number of mobile communication units. The message is commonly referred to as a broadcast message, and may be, among other things, traffic, weather or sports information, emergency information, speech or video segments or a software download.

It is generally known to deliver a broadcast message to a number of mobile communication units over a CDMA paging channel. See, for example, TIA/EIA Interim Standard IS-637, incorporated herein by reference. Because CDMA paging channels are generally broadcast with high down-link power, however, sending unnecessary or excessive messages over a paging channel may cause interference and may degrade down-link capacity. And down-link capacity may be further reduced if the broadcast message is transmitted over more than one paging code channel.

It is also known to deliver a broadcast message via a CDMA traffic channel. When a broadcast message is being transmitted over a traffic channel, it is typically sent at the maximum baseband data rate. When a large number of mobile communication units are to receive the message, a spike in down-link power may occur and cause poor reception at the mobile communication units.

Existing techniques for delivering broadcast messages over CDMA paging or traffic channels may also result in multiple copies of the same broadcast message in the common frequency spectrum received by each mobile communication unit.

There is therefore a need for an improved method for delivering a broadcast message over a CDMA signaling or traffic channel which reduces down-link interference and which minimizes a number of copies of the broadcast message in the common frequency spectrum.

SUMMARY OF THE INVENTION

According to an aspect of the present invention, the foregoing needs are addressed by a method for distributing a message to a mobile communication unit. The method operates in a wireless code division multiple access (CDMA) communication system which includes a fixed communication unit. The fixed communication unit has a plurality of paging channels and a plurality of traffic channels. A mobile communication unit is responsive to the fixed communication unit via an active paging channel of the plurality of paging channels. The method includes selecting a paging channel of the plurality of paging channels over which to transmit the message to form a selected paging channel; transmitting a preliminary message via each of the plurality of paging channels, the preliminary message comprising the selected paging channel; and transmitting the message over the selected paging channel, the mobile communication unit receiving the message over the selected paging channel while continuing to monitor the active paging channel.

According to another aspect of the present invention, a method for distributing a message to a mobile communication unit operates in a wireless code division multiple access (CDMA) communication system. The CDMA communication system includes a fixed communication unit. The fixed communication unit has a plurality of paging channels and a plurality of traffic channels. The mobile communication unit is responsive to the fixed communication unit via an active traffic channel of the plurality of traffic channels. The method includes selecting a paging channel of the plurality of paging channel over which to transmit the message to form a selected paging channel; transmitting a preliminary message via the active traffic channel, the preliminary message comprising the selected paging channel; and transmitting the message over the selected paging channel, the mobile communication unit receiving the message over the selected paging channel while continuing to monitor the active traffic channel.

According to a further aspect of the present invention, a method for distributing a message to a mobile communication unit operates in a wireless code division multiple access (CDMA) communication system. The CDMA communication system includes a fixed communication unit. The fixed communication unit has a paging channel and a plurality of traffic channels. The mobile communication unit is responsive to the fixed communication unit via the paging channel. The method includes selecting a traffic channel of the plurality of traffic channels over which to transmit the message to form a selected traffic channel; transmitting a preliminary message via the paging channel, the preliminary message comprising the selected traffic channel; and transmitting the message over the selected traffic channel, the mobile communication unit receiving the message over the selected traffic channel while continuing to monitor the paging channel.

According to a still further aspect of the present invention, a method for distributing a message to a mobile communication unit operates in a wireless code division multiple access (CDMA) communication system. The CDMA communication system includes a fixed communication unit. The fixed communication unit has a paging channel and a plurality of traffic channels. The mobile communication unit is responsive to the fixed communication unit via an active traffic channel of the plurality of traffic channels. The method includes selecting a traffic channel of the plurality of traffic channels over which to transmit the message to form a selected traffic channel; transmitting a preliminary message via the active traffic channel, the preliminary message comprising the selected traffic channel; and transmitting the message over the selected traffic channel, the mobile communication unit receiving the message over the selected traffic channel while continuing to monitor the active traffic channel.

Advantages of the present invention will become readily apparent to those skilled in the art from the following description of the preferred embodiment(s) of the invention which have been shown and described by way of illustration. As will be realized, the invention is capable of other and different embodiments, and its details are capable of modifications in various respects. Accordingly, the drawings and description are to be regarded as illustrative in nature, and not as restrictive.

DETAILED DESCRIPTION OF THE PREFERRED EMBODIMENTS

Figure 1:
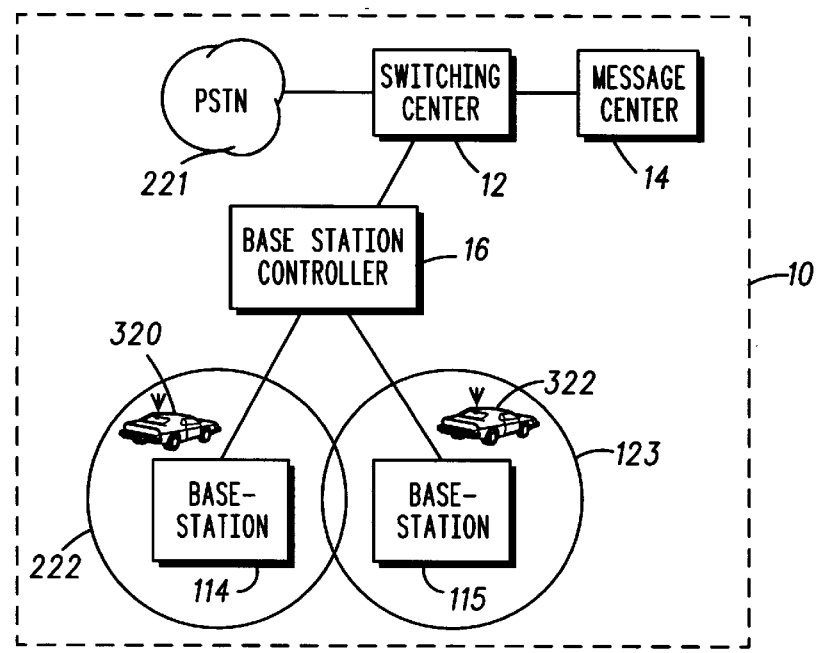
FIG. 1 is a block diagram of a wireless communication system suitable for use with the embodiments of the present invention.

Turning now to the drawings, wherein like numerals designate like components, FIG. 1 is a block diagram of a wireless communication system 10. A communication system using digital channelization which is suitable for use with the various embodiments of the present invention is described in detail in IS-95A. As shown in FIG. 1, a switching center 12, which may be a mobile switching center such as an EMX™ 2500, commercially available from Motorola, Inc. or another suitable type of switching center, is in communication with, among other things, base station controller 16, public switched telephone network (PSTN) 221 and a message center 14.

Message center 14 may be, for example, an intelligent peripheral such as a service node, available from Motorola, Inc., or another suitable device such as a message register, also available from Motorola.

Base station controller 16 may include at least one processor (not shown) and one or more memories (not shown), and are commercially available from Motorola, Inc. Base station controller 16 is in turn in communication with two base stations 114 and 115, each of which may include a plurality of transceivers (not shown), along with one or more processors (not shown) and one or more memories (not shown), which are also available from Motorola, Inc. Additional base station controllers may be coupled to switching center 12. Likewise, additional base stations may be coupled to base station controller 16. It is further contemplated herein that base stations 114 and 115 may be sectors of a sectorized base station (not shown).

Mobile stations 320 and 322, such as mobile radiotelephones available from Motorola, are shown operating in areas 222 and 223 served by base stations 114 and 115, respectively.

Figure 2:
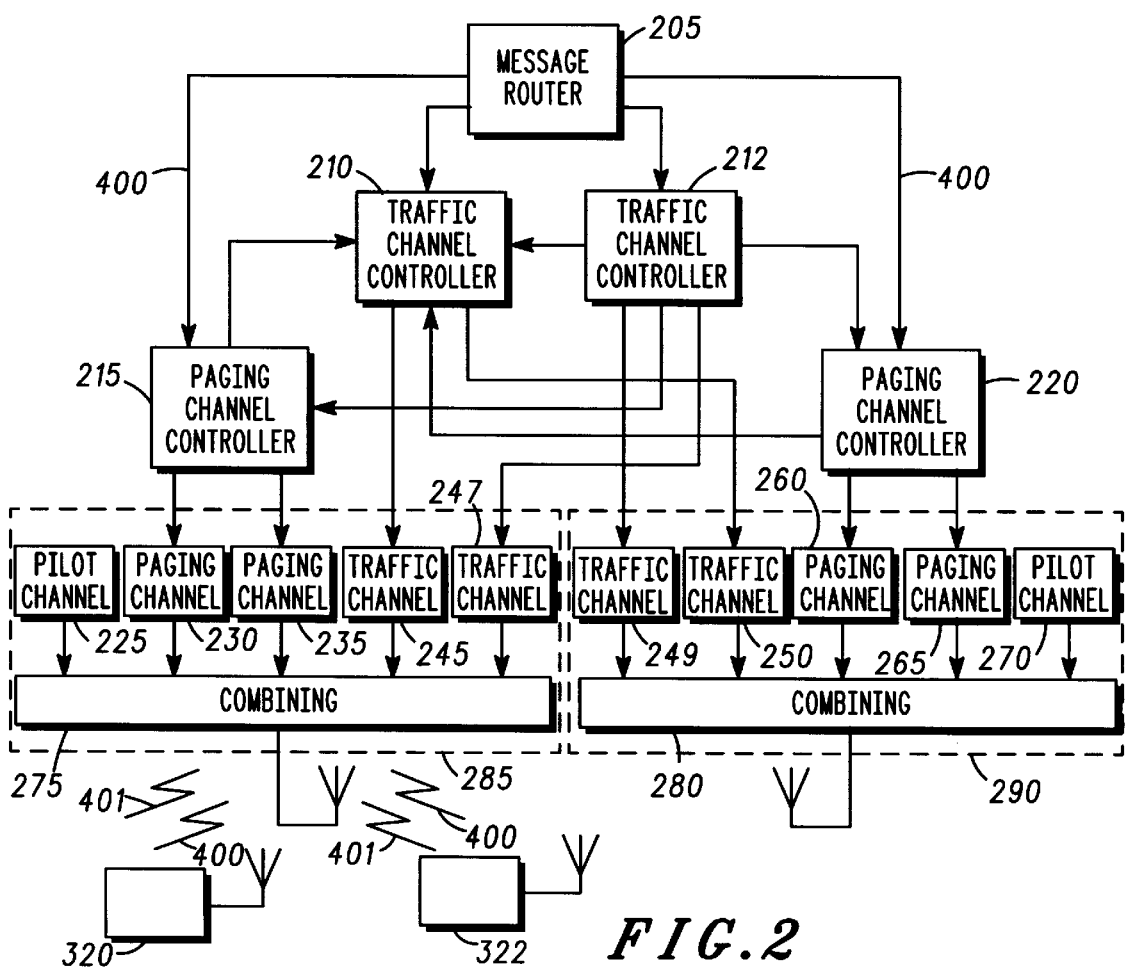
FIG. 2 is a block diagram of a portion of the wireless communication system shown in FIG. 1, according to a preferred embodiment of the present invention.

FIG. 2 is a block diagram of a portion of the wireless communication system shown in FIG. 1. Message router 205 is preferably included within, or in communication with, base station controller 16 and is responsible for distributing messages 400 to be broadcast to mobile communication units 320 and 322. Messages 400 may include, for example, traffic, weather and sports information, emergency information, speech or video segments or a software download, among other things. For purposes of discussion, it is assumed that message router 205 is responsive to base station controller 16. Message router 205 is in communication with paging channel controllers 215 and 220.

Paging channel controller 215 is preferably included within, or in communication with, base station 114. Paging channel controller 215 may include one or more queues (not shown) which hold messages received from message router 205.

Paging channel controller 220 is preferably included within, or in communication with, base station 115. Paging channel controller 220 may include one or more queues (not shown) which hold messages received from message router 205.

Although paging channel controllers 215 and 220 are described as being included in, or in communication with, base stations 114 and 115, respectively, it will be appreciated that controllers 215 and 220 may positioned at any suitable location within communication system 10, for example, within, or in communication with, base station controller 16. The functions of paging channel controllers 215 and 220 may be implemented in hardware and/or software. A general purpose computer, for example, may be programmed according to well-known methods to control the formatting and delivery of messages 400 by paging channel controllers 215 and 220.

Paging channel controller 215 is responsive to transmit block 285, which includes pilot channel 225, paging channels 230 and 235 and traffic channels 245 and 247. As is well-known, channels 225, 230, 235, 245 and 247 may be associated with Walsh codes or other unique spreading codes. Transmit block 285 is preferably associated with base station 114 or another base station responsive to base station controller 16.

Likewise, paging channel controller 220 is responsive to transmit block 290, which includes pilot channel 270, paging channels 260 and 265 and traffic channels 249 and 250. Channels 270, 260, 265, 249 and 250 may be associated with Walsh codes or other unique spreading codes, as is well-known. Transmit block 290 is preferably associated with base station 115.

Transmit blocks 285 and 290 are responsible for interleaving, encoding, spreading, combining, modulating and transmitting information over channels in a CDMA system such as a system based on IS-95A or IS-96. For example, pilot channels 225 and 270 generate pilot signals according to well-known methods, traffic channels 245, 247, 249 and 250 generate traffic signals according to well-known methods and paging channels 230, 235, 260 and 265 generate paging signals according to well-known methods. Combiners 275 and 280, which are responsive to the channels, are responsible for combining, modulating and transmitting forward-link communication signals from base stations 114 and 115, respectively. Transmit block 285 and 290 may each be implemented as one or more base station transceivers, available from Motorola, Inc.

Traffic channel controller 210, which is preferably included within, or in communication with, base station controller 16, is responsive to traffic channel controller 212, paging channel controller 215, paging channel controller 220, transmit block 285 and transmit block 290. Traffic channel controller 210 is responsible for formatting down-link communication signals, including voice, data or other information, associated with a mobile communication unit such as mobile communication unit 322.

Traffic channel controller 212, which is preferably included within, or in communication with, base station controller 16, is responsive to traffic channel controller 210, paging channel controller 215, paging channel controller 220, transmit block 285 and transmit block 290. Traffic channel controller 212 is preferably dedicated to the formatting of broadcast messages, such as messages 400.

The functions of traffic channel controllers 210 and 212 may be implemented in software and hardware and may be realized using one or more processors. A base station controller available from Motorola, Inc. is an example of a suitable architecture for implementing traffic channel controllers 210 and 212.

According to a first aspect of the present invention, a message, such as message 400, received by message router 205 may be directed to a large number of mobile communication units over one or more paging channels in a wireless CDMA communication system.

For purposes of discussion of one example of the first aspect, it is assumed that it is desired to send message 400 to a group of mobile communication units, including unit 320, in communication with base station 114. It is further assumed that mobile communication unit 320 is monitoring a paging signal (not shown) generated by paging channel 230.

Initially, message router 205 may distribute message 400 to paging channel controller 215 associated with base station 114.

Paging channel controller 215 preferably identifies and selects a paging channel, such as paging channel 235, from available paging channels 235 and 230. The selected paging channel is preferably one which is least loaded. A time slot (not shown) is allocated on selected paging channel 235. Thus, paging channel controller 215 has arranged for message 400 to be sent via paging channel 235 at a designated time associated with the allocated time slot.

Next, paging channel controller 215 causes a preliminary message 401 to be transmitted on all paging channels 230, 235 associated with transmit block 285. Preliminary message 401 preferably indicates to mobile communication unit 320, among other mobile communication units within area 222 served by base station 114, on which channel, at what time, and at what timing (PN) offset message 400 will be transmitted. Perliminary message 401 may also include a broadcast address associated with a group of mobile communication units. Paging channel controller 215 also directs preliminary message 401 to traffic channel controller 210.

Message 400 may then be transmitted via paging channel 235 at the allocated time and PN offset, and received by mobile communication unit 320, while unit 320 continues to monitor paging channel 230. After receipt of message 400 over paging channel 235, unit 322 may cease to monitor paging channel 235.

For purposes of discussion of another example of the first aspect of the present invention, it is assumed that it is desired to send message 400 to a group of mobile communication units, including unit 322, which is engaged in communication (for example, unit 322 is a party to a radiotelephone call) and is in soft handoff with base stations 114 and 115. It is further assumed that traffic channel controller 210 is formatting down-link information which is transmitted to communication unit 322 via traffic channels 245 and 250, and that unit 322 has reported the strongest received pilot channel to be pilot channel 270.

Initially, message router 205 may distribute message 400 to paging channel controllers 215 and 220 associated with base stations 114 and 115, respectively.

Paging channel controller 215 preferably identifies and selects a paging channel, such as paging channel 235, from available paging channels 235 and 230. The selected paging channel is preferably one which is least loaded. A time slot (not shown) is allocated on selected paging channel 235. Thus, paging channel controller 215 has arranged for message 400 to be sent via paging channel 235 at a designated time associated with the allocated time slot.

Paging channel controller 220 also preferably identifies and selects a paging channel, such as paging channel 265, from available paging channels 260 and 265. The selected paging channel is preferably one which is least loaded. A time slot (not shown) is allocated on selected paging channel 265. Thus, paging channel controller 220 has arranged for message 400 to be sent via paging channel 265 at a designated time associated with the allocated time slot.

Next, paging channel controllers 215 and 220 cause preliminary messages 401 to be transmitted to traffic channel controller 210. Preliminary messages 401 preferably indicate to traffic channel controller 210 on which channels, at what times, and at what PN offsets message 400 will be transmitted.

Traffic channel controller 210 is aware that mobile communication unit 322 has reported pilot channel 270, which is associated with base station 115 and paging channel controller 220, to be the strongest received pilot channel, and therefore transmits the content of preliminary message 401 received by traffic channel controller 210 from paging channel controller 220 to mobile communication unit 322. Alternatively, traffic channel controller 210 may transmit the content of preliminary messages 401 received from both paging channel controller 210 and paging channel controller 220, and allow mobile communication unit 322 to choose the best paging channel over which to receive message 400.

Message 400 may then be received by unit 322 via paging channels 235 or 265 while unit 322 continues to monitor traffic channels 245 and 250. After message 400 has been received by mobile communication unit 322, unit 322 may cease monitoring paging channel 235 or 265.

According to a second aspect of the present invention, a message, such as message 400, received by message router 205 may be directed to a large number of mobile communication units over one or more traffic channels in a wireless CDMA communication system.

For purposes of discussion of one example of the second aspect, it is assumed that it is desired to send message 400 to a group of mobile communication units, including unit 320, which is in operation in area 222 served by base station 314. It is further assumed that mobile communication unit 320 is monitoring a paging signal (not shown) generated by paging channel 230, and that unit 320 is moving in the direction of area 223, served by base station 115.

Initially, message 400 is delivered by message router 205 to traffic channel controller 212, which allocates at least one traffic channel associated with each base station 114, 115 to transmit message 400. For example, traffic channels 247 and 249 may be allocated by traffic channel controller 212 for transmission of message 400.

Traffic channel controller 212 next transmits a first preliminary message (not shown) to paging channel controllers 215 and 220 associated with base stations 114 and 115, along with any other base stations (not shown) involved in the transmission of message 400. The first preliminary message will indicate which PN offsets and traffic channels have been selected for transmission of the message. The first preliminary message may also include a scrambling sequence for receiving message 400, if the scrambling sequence is not predetermined.

Upon receiving the first preliminary message, paging channel controllers 215 and 220 may determine which PN offsets are applicable to mobile communication units monitoring paging channels associated with base stations 114 and 115, respectively. For example, paging channel controller 215 may identify the PN offset (not shown) applicable to mobile station 320 monitoring paging channel 230 associated with base station 114. In addition, paging channel controllers 215 and 220 may also identify PN offsets associated with neighboring base stations.

Next, paging channel controller 215 causes a second preliminary message 401 to be transmitted on all paging channels 230, 235 associated with transmit block 285. Second preliminary message 401 preferably indicates to mobile communication unit 320, among other mobile communication units within area 222 served by base station 114, on which traffic channels and at what PN offsets message 400 will be transmitted. It is contemplated that a subset of PN offsets and traffic channels may be transmitted via second preliminary message 401, and that message 401 may also include a broadcast address associated with a group of mobile communication units. Paging channel controller 220 performs similar functions to inform mobile communication units in area 223 served by base station 115 on which channels and at what PN offsets message 400 will be sent.

Mobile communication unit 320 will then have the necessary information to be able to receive message 400 by monitoring the identified traffic channels of any base station 114, 115 which has a sufficiently strong pilot channel.

For example, if, as mobile communication unit 320 moves toward base station 115, the strength of pilot channel 270 becomes sufficiently strong, unit 320 may receive message 400 via traffic channel 249 in addition to traffic channel 247 (assuming traffic channels 247 and 249 were indicated in the second preliminary message to be transmitting message 400). Thus, mobile communication unit 320 may continue to move through communication system 10 and receive message 400 as long as it is able to receive sufficiently strong pilot signals from base stations transmitting message 400. Moreover, unit 320 may continue to monitor paging channels as it moves through system 10.

Preferably, traffic channel controller 212 will begin sending null traffic channel data to traffic channels 247 and 249 to allow mobile communication units, such as unit 320, sufficient time to begin to receive message 400. It is also contemplated that traffic channel controller 212 could, in addition to message 400, transmit identities of all traffic channels transmitting message 400, enabling mobile communication unit 320 to move outside of the range of the initial list of traffic channels and PN offsets transmitted via paging channel 230 and still receive message 400.

For purposes of discussion of another example of the second aspect of the present invention, it is assumed that it is desired to send message 400 to a group of mobile communication units, including unit 322, which is engaged in communication (for example, unit 322 is a party to a radiotelephone call) and is in soft handoff with base stations 114 and 115. It is further assumed that traffic channel controller 210 is formatting down-link information which is transmitted to communication unit 322 via traffic channels 245 and 250, and that unit 322 has reported the strongest received pilot channel to be pilot channel 270.

Initially, message 400 is delivered by message router 205 to traffic channel controller 212, which allocates at least one traffic channel associated with each base station 114, 115 to transmit message 400. For example, traffic channels 247 and 249 may be allocated by traffic channel controller 212 for transmission of message 400.

Traffic channel controller 212 next transmits a first preliminary message (not shown) to other traffic channel controllers 210 which are communication with mobile communication units desiring to receive message 400. The first preliminary message may indicate the PN offsets and traffic channels allocated for transmission of message 400. If message 400 is to be delivered over more than one base staion controller, traffic channel controller 212 may also request that traffic channels be allocated to the multiple base stations within control of the other base station controllers.

Upon receiving the first preliminary message, traffic channel controller 210 may determine which PN offset(s) is applicable to the mobile communication unit with which it is communicating, and inform the mobile communication unit using a second preliminary message via the traffic channel already in use. Because message 400 could potentially be sent over a large geographic area, and it may not be possible for a particular mobile communication unit to receive transmissions associated with all base stations transmitting the message, and informing each unit of all of the PN offsets and traffic channels over which message 400 will be broadcast may waste traffic channel capacity. Thus, a subset of PN offsets associated with base stations with which soft handoff is likely may be sent.

Thus, to receive message 400 while simultaneously continuing to communicate over the original traffic channel, mobile communication unit 320 may receive any traffic channel identified in the second preliminary message which is associated with a base station having a pilot channel received with sufficient strength. And mobile communication unit 320 may continue to move through communication system 10 and receive message 400 as long as it is able to receive sufficiently strong pilot signals from base stations transmitting message 400. To further facilitate receipt of message 400 by a moving communication unit, the list of traffic channels and PN offsets over which message 400 is to be transmitted may be sent via the same traffic channel over which message 400 is being broadcast.

If a frequency of the original traffic channel in use by mobile communication unit 320 is different than a frequency of the traffic channel over which message 400 is to be broadcast, a hard handoff of the original traffic channel to the frequency of the traffic channel over which message 400 is to be transmitted may be initiated. It may be desirable to prohibit interfrequency handoffs while message 400 is being transmitted.

After broadcast of message 400 is complete, a termination message may be sent via traffic channel controller 212 which informs mobile communication units, including unit 322, that they may cease monitoring the traffic channel over which message 400 was transmitted. If a prohibition of traffic channel handoff to another frequency had been in effect, it may be lifted.

Figure 3:
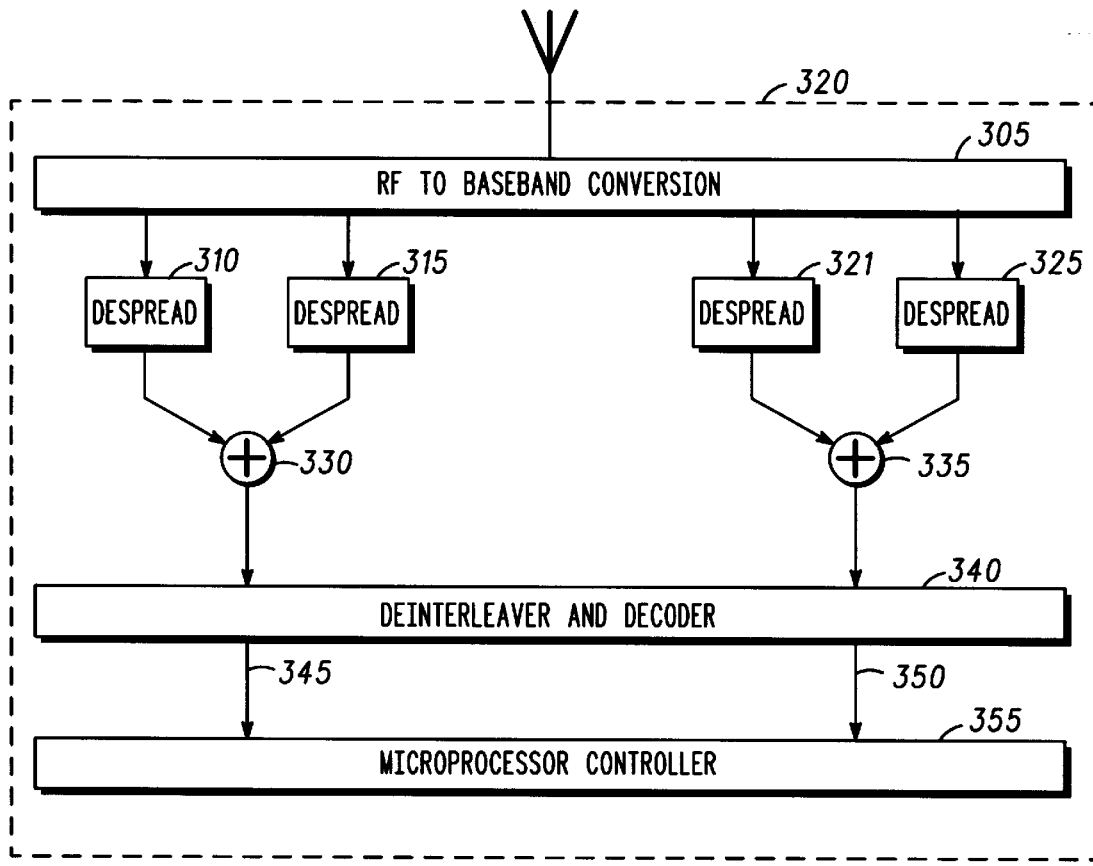
FIG. 3 is a block diagram of a portion of the mobile communication units shown in FIGS. 1 and 2.

FIG. 3 illustrates a portion of mobile combination unit 320. Mobile communication unit 322 is substantially identical to unit 320. Block 305 is responsible for demodulating, according to well-known methods, signals received from base stations, such as base stations 114 and 115. Block 305 is coupled to despread blocks 310, 315, 321 and 325, which despread signals from one or more down-link channels, such as traffic channels or paging channels, at one or more PN offsets, using well-known techniques. Signals from despread blocks 310 and 315 are combined at combiner 330 and passed to deinterleaver and decoder block 340. Signals from despread blocks 321 and 325 are combined at combiner 335 and are also passed to deinterleaver and decoder block 340. Deinterleaver and decoder 340 is implemented using well-known techniques and methods. Deinterleaved and decoded signal 345, representing down-link traffic channel data or down-link paging channel data, and deinterleaved and decoded signal 350, representing different down-link traffic channel data or down-link paging channel data, are passed to microprocessor controller 355. Controller 355 may also control the despreading functions of despreaders 310, 315, 321 and 325 and the combining functions of combiners 330 and 335.

Figure 4:
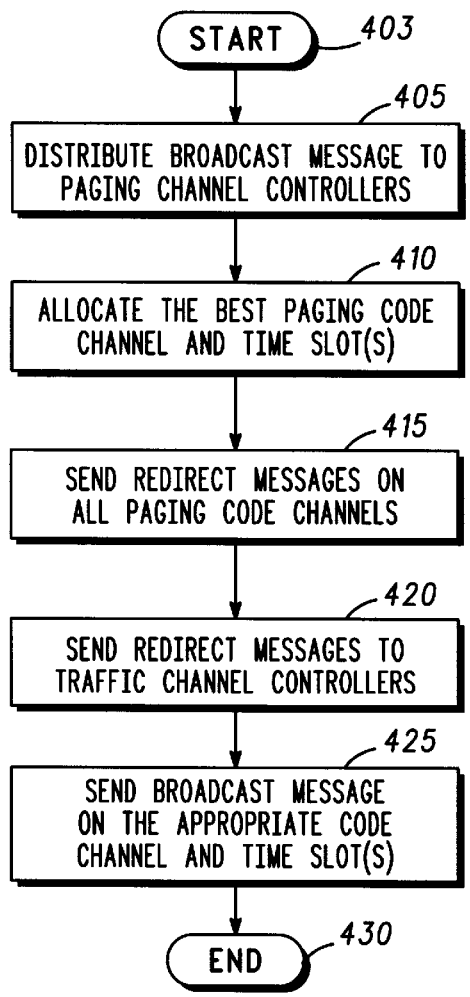
FIG. 4 is a flowchart depicting one method for distributing a message to a number of mobile communication units via one or more paging channels in a wireless CDMA communication system.

FIG. 4 is a flowchart depicting a method for distributing a broadcast message, such as message 400, to a number of mobile communication units via a paging channel in a wireless CDMA communication system. The method begins at block 403 and continues to block 405, where a message router distributes a broadcast message to one or more paging channel controllers. The message may include a broadcast address and data to be sent to the mobile communication units. The message may also include a timing window within which the message should be sent over the paging channel. The beginning of the timing window may be defined by the worst-case delay for a mobile communication unit to be successfully directed, via a traffic channel, to begin to decode a paging channel to receive the message. At step 410, the paging channel controller receives the message and allocates the best paging code channel and time slot(s) within the specified timing window. At block 415, the paging channel controller sends preliminary messages, such as redirection messages, via all of its paging channels. The preliminary messages direct the mobile communication units to the allocated paging channels and time slot(s). At step 420, the paging channel controller sends preliminary messages, such as redirection messages, to all traffic channel controllers which are sending down-link traffic data over the same frequency and PN offset as the paging channel controller. The redirection messages include the allocated paging channel, time slot(s), a PN offset, and the broadcast address. As shown at block 425, the paging channel controller transmits the message over the allocated paging channel and time slot(s). Steps 410 through 425 may be repeated for each paging channel controller over which the message is to be sent.

Figure 5:
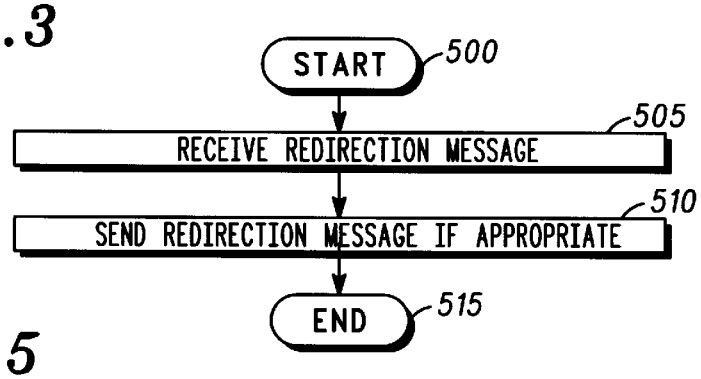
FIG. 5 is a flowchart illustrating another method for distributing a message to a number of mobile communication units via one or more paging channels in a wireless CDMA communication system.

FIG. 5 is a flowchart illustrating another method for distributing a broadcast message, such as message 400, to a number of mobile communication units via a paging channel in a wireless CDMA communication system. At step 505, a traffic channel controller receives the message from a paging channel controller. At step 510, the traffic channel controller determines whether it should send a preliminary message, also referred to as a redirection message, over the down-link traffic channel. The traffic channel controller preferably has a list of broadcast addresses which the mobile communication unit with which it is in conversation is programmed to receive. If the address in the redirection message is included within the list, and the mobile communication unit has reported that its strongest received pilot channel is the pilot transmitted by the base station associated with the paging channel controller that sent the redirection message, then the traffic channel controller may send the redirection message to the subscriber unit. The redirection message may include the traffic channel, time slot(s), and PN offset which were in the message received from the paging channel controller.

Figure 6:
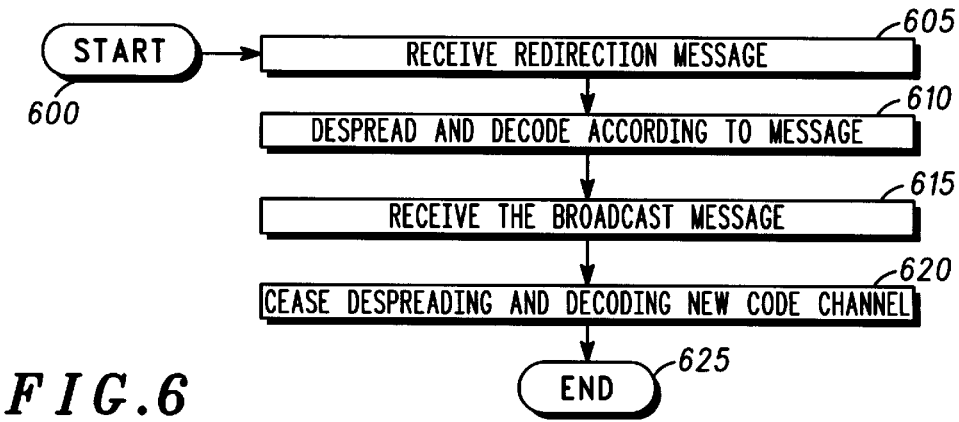
FIG. 6 is a flowchart illustrating a method for receiving a broadcast message by a mobile communication unit operating in a wireless CDMA communication system.

FIG. 6 is a flowchart illustrating a method for receiving a broadcast message, such as message 400, by a mobile communication unit, such as unit 320, operating in a wireless CDMA communication system. At step 605, the mobile communication unit receives a preliminary, or redirection, message. The message may be received over either a down-link traffic channel or a down-link paging channel. At step 610, the unit begins to despread and decode according to the information in the received message. At step 615, the unit receives the broadcast message. The unit may take any appropriate action, such as displaying the message to the user. At block 620, the mobile communication unit resumes normal processing. If, prior to step 610, the unit had not already been despreading and decoding in accordance with the message received at step 605, it will cease doing so.

Figure 7:
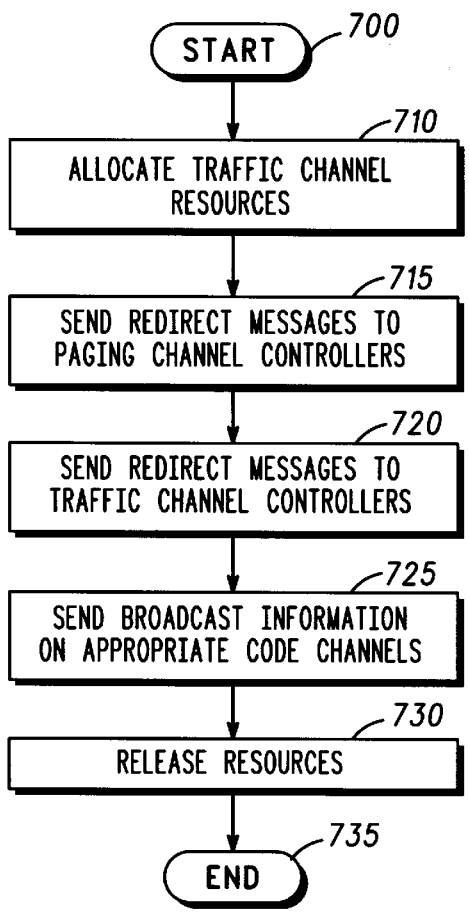
FIG. 7 is a flowchart illustrating one method for disseminating a message to a number of mobile communication units via one or more traffic channels in a wireless CDMA communication system.

FIG. 7 illustrates a method for disseminating a broadcast message, such as message 400, to a number of mobile communication units via a traffic channel in a wireless CDMA communication system. At step 710, a traffic channel controller begins setting up resources, such as traffic channels, for the message to be transmitted over a particular CDMA frequency. Traffic channels are allocated in the base stations which will transmit the message. Traffic channels are informed of the scrambling sequence to use and/or the Walsh codes to use. The traffic channel controller begins to transmit null traffic data which is then transmitted by the traffic channels. At step 715, the traffic channel controller sends first preliminary, or first redirection, messages to paging channel controllers associated with base stations transmitting the message. The redirection messages may include a broadcast address, PN offsets and Walsh codes to be used for the message transmission, and possibly a scrambling sequence. The paging channel controllers then send second preliminary messages with the same information over all associated paging channels. Unnecessary PN offsets and Walsh codes may be excluded from the paging channel second preliminary messages. At step 720, the traffic channel controller sends redirection messages to traffic channel controllers associated with base stations to be sending the broadcast message. The redirection messages may include a broadcast address, PN offsets and Walsh codes, and possibly a scrambling sequence. The redirection messages also include the frequency used to send the message. At step 725, the traffic channel controller sends broadcast information over the allocated traffic channels after a sufficient time delay. The traffic channel controller may also send a message which contains the PN offsets and Walsh codes of all base stations involved in the transmission, along with the message.

At step 730, the traffic channel controller has completed sending the message. The allocated traffic channel sends a message to all mobile communication units informing them that the message is complete. All Walsh codes, traffic channels and communication links associated with the transmission of the message are freed. Other traffic channel controllers which are communicating with units which were receiving the message may be informed of the end of the message and may then permit inter-frequency hard handoffs if they had been prohibited due to the transmission of the message.

Figure 8:
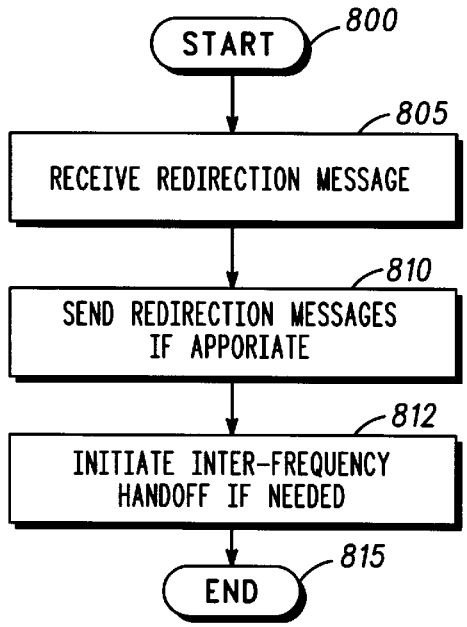
FIG. 8 is a flowchart illustrating another method for delivering a message to a number of mobile communication units via one or more traffic channels in a wireless CDMA communication system.

FIG. 8 illustrates another method for delivering a redirection message to a number of mobile communication units via a traffic channel in a wireless CDMA communication system. At step 805, a traffic channel controller receives a redirection message from another traffic channel controller. At step 810, the traffic channel controller determines whether it should send a redirection message over a down-link traffic channel. The traffic channel controller preferably has a list of broadcast addresses which the mobile communication unit with which it is in conversation is programmed to receive. If the broadcast address in the redirection message is on the list, then the traffic channel controller will send a redirection message to the unit which includes information from the message received from the traffic channel controller, such as PN offsets, Walsh codes and scrambling sequences. Unnecessary PN offsets and Walsh codes may be excluded from the redirection messages. At step 815, the traffic channel controller initiates a hard handoff of the existing traffic channel to the same frequency as the broadcast traffic channel, if the frequency in the redirection message is different from the frequency used for the existing traffic channel transmission.

Figure 9:
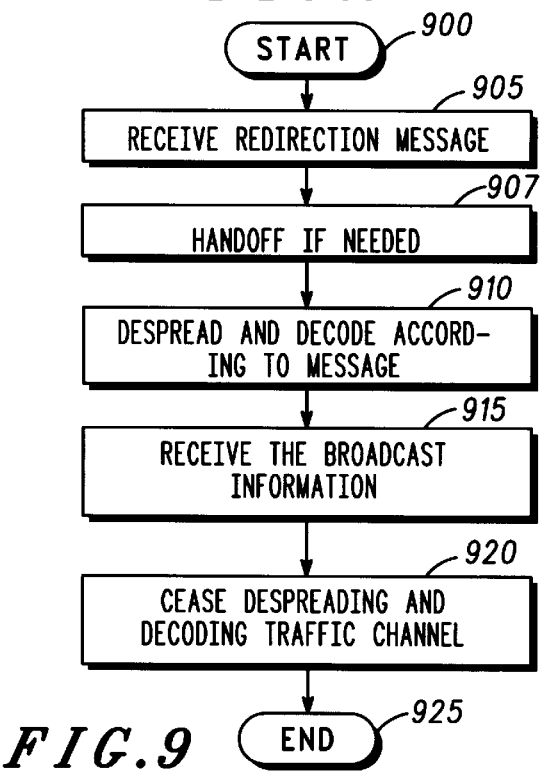
FIG. 9 is a flowchart illustrating a method for receiving a broadcast message by a mobile communication unit operating in a wireless CDMA communication system.

FIG. 9 illustrates a method for receiving a broadcast message, such as message 400, by a mobile communication unit, such as unit 320, operating in a wireless CDMA communication system. At step 905, the unit receives a preliminary, or redirection message. The message may be received over either a down-link traffic channel or a down-link paging channel. At step 907, a hard handoff to another frequency is performed if the unit is to receive the broadcast message over a different frequency than the frequency currently being used. At step 910, the unit begins despreading and decoding according to the information in the received message. At step 915, the unit receives the broadcast message. The subscriber unit may take any appropriate action, which may vary depending on the nature of the broadcast information. The mobile communication unit may also receive Walsh codes and PN offsets of all, or some, base stations transmitting the broadcast message. The unit may handoff to any base station which is transmitting the message, so long as the base station has a pilot channel signal which is received by the unit at a sufficient strength. At step 920, the unit receives an indication that the message is finished, and the unit resumes normal call processing.

Thus, the various methods and aspects of the present invention described herein allow a mobile communication unit receiving a broadcast message on a paging or traffic channel to continue call processing on a different paging or traffic channel while receiving the broadcast message. In addition, the various methods described herein allow for delivering a broadcast message over a CDMA signaling or traffic channel with minimal down-link interference and with a minimal number of copies of the broadcast message in the common frequency spectrum.

The principles of the present invention which apply to cellular-based CDMA communication systems may also apply to other types of communication systems, including but not limited to personal communication systems, trunked systems, satellite communication systems and data networks. Likewise, the principles of the present invention which apply to spread spectrum radio frequency channels also apply to other types of communication channels, such as electronic data buses, wireline channels, optical fiber links and satellite links.

It will be apparent that other and further forms of the invention may be devised without departing from the spirit and scope of the appended claims and their equivalents, and it will be understood that this invention is not to be limited in any manner to the specific embodiments described above, but will only be governed by the following claims and their equivalents.

I claim:

1. In a wireless code division multiple access (CDMA) communication system having a fixed communication unit, the fixed communication unit having a plurality of paging channels and a plurality of traffic channels and a mobile communication unit responsive thereto via an active paging channel of the plurality of paging channels, a method for distributing a message to the mobile communication unit, comprising the steps of:

selecting a paging channel of the plurality of paging channels over which to transmit the message to form a selected paging channel;

transmitting a preliminary message via each of the plurality of paging channels, the preliminary message comprising the selected paging channel;

selecting a time at which to transmit the message, the selected time based on a worst-case delay associated with the mobile communication unit beginning to receive the selected paging channel; and transmitting the message over the selected paging channel, the mobile communication unit receiving the message over the selected paging channel while continuing to monitor the active paging channel.

2. The method according to claim 1, wherein the selected time is included in the preliminary message.

3. The method according to claim 1, wherein the preliminary message indicates a broadcast address associated with a predetermined group of mobile communication units.

4. The method according to claim 1, wherein the preliminary message indicates a timing offset associated with the selected paging channel.

5. The method according to claim 1, wherein the selected paging channel is a least loaded paging channel of the plurality of paging channels.

6. The method according to claim 1, wherein the fixed communication unit comprises a base station system.

7. In a wireless code division multiple access (CDMA) communication system having a fixed communication unit, the fixed communication unit having a plurality of paging channels and a plurality of traffic channels and a mobile communication unit responsive thereto via an active traffic channel of the plurality of traffic channels, a method for distributing a message to the mobile communication unit, comprising the steps of:

selecting a paging channel of the plurality of paging channel over which to transmit the message to form a selected paging channel;

selecting a time at which to transmit the message, the selected time based on a worst-case delay associated with the mobile communication unit beginning to receive the selected paging channel;

transmitting a preliminary message via the active traffic channel, the preliminary message comprising the selected paging channel; and transmitting the message over the selected paging channel, the mobile communication unit receiving the message over the selected paging channel while continuing to monitor the active traffic channel.

8. In a wireless code division multiple access (CDMA) communication system having a fixed communication unit, the fixed communication unit having a paging channel and a plurality of traffic channels and a mobile communication unit responsive thereto via the paging channel, a method for distributing a message to the mobile communication unit, comprising the steps of:

selecting a traffic channel of the plurality of traffic channels over which to transmit the message to form a selected traffic channel;

selecting a time at which to transmit the message, the selected time based on a worst-case delay associated with the mobile communication unit beginning to receive the selected traffic channel;

transmitting a preliminary message via the paging channel, the preliminary message comprising the selected traffic channel; and transmitting the message over the selected traffic channel, the mobile communication unit receiving the message over the selected traffic channel while continuing to monitor the paging channel.

9. In a wireless code division multiple access (CDMA) communication system having a fixed communication unit, the fixed communication unit having a paging channel and a plurality of traffic channels and a mobile communication unit responsive thereto via an active traffic channel of the plurality of traffic channels, a method for distributing a message to the mobile communication unit, comprising the steps of:

selecting a traffic channel of the plurality of traffic channels over which to transmit the message to form a selected traffic channel;

selecting a time at which to transmit the message, the selected time based on a worst-case delay associated with the mobile communication unit beginning to receive the selected traffic channel;

transmitting a preliminary message via the active traffic channel, the preliminary message comprising the selected traffic channel; and transmitting the message over the selected traffic channel, the mobile communication unit receiving the message over the selected traffic channel while continuing to monitor the active traffic channel.

10. The method according to claim 9, further comprising the steps of:

comparing a frequency associated with the active traffic channel with a frequency associated with the selected traffic channel; and based on the comparison, handing off the active traffic channel to the frequency associated with the selected traffic channel.

11. In a wireless code division multiple access (CDMA) communication system having a fixed communication unit, the fixed communication unit having a paging channel and a plurality of traffic channels and a mobile communication unit responsive thereto via an active traffic channel of the plurality of traffic channels, a method for distributing a message to the mobile communication unit, comprising the steps of:

selecting a traffic channel of the plurality of traffic channels over which to transmit the message to form a selected traffic channel;

transmitting a preliminary message via the active traffic channel, the preliminary message comprising the selected traffic channel;

transmitting the message over the selected traffic channel, the mobile communication unit receiving the message over the selected traffic channel while continuing to monitor the active traffic channel;

comparing a frequency associated with the active traffic channel with a frequency associated with the selected traffic channel; and based on the comparison, handing off the active traffic channel to the frequency associated with the selected traffic channel.

* * * * *